April 12, 1927.

O. E. BUCKLEY 1,624,470

SIGNALING CONDUCTOR SYSTEM AND METHOD OF OPERATION

Filed Aug. 19, 1922

INVENTOR.
O. E. Buckley
BY C. C. Sprague
ATTORNEY

Patented Apr. 12, 1927.

1,624,470

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

SIGNALING CONDUCTOR SYSTEM AND METHOD OF OPERATION.

Application filed August 19, 1922. Serial No. 582,875.

It is an object of the present invention to provide for efficient operation of a signaling conductor. Another object is to accomplish efficient duplex operation of a signaling conductor. Another object is to provide for such operation of a long loaded telegraph conductor. Still another object relates to providing apparatus for such operation of a signaling conductor. These and other objects will become apparent on consideration of an example of specific practice under the invention as set forth in the following specification. The invention will be defined in the appended claims.

Figure 1:
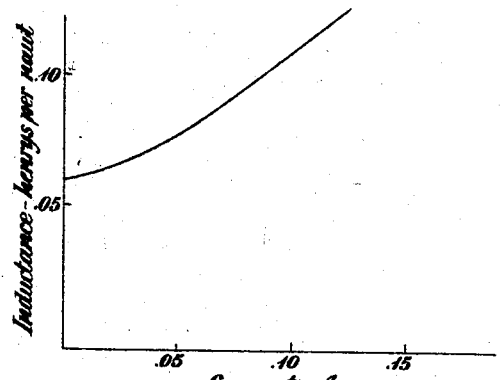
Figure 2:
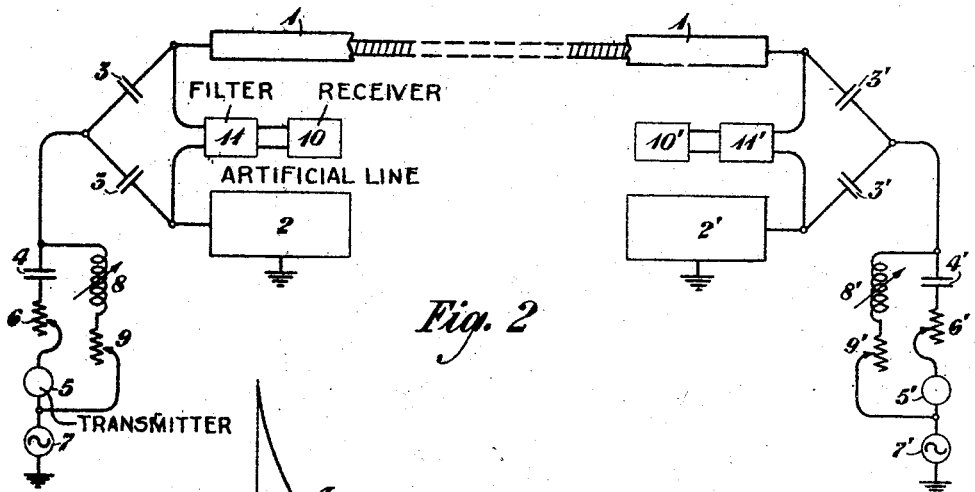
Figure 3:
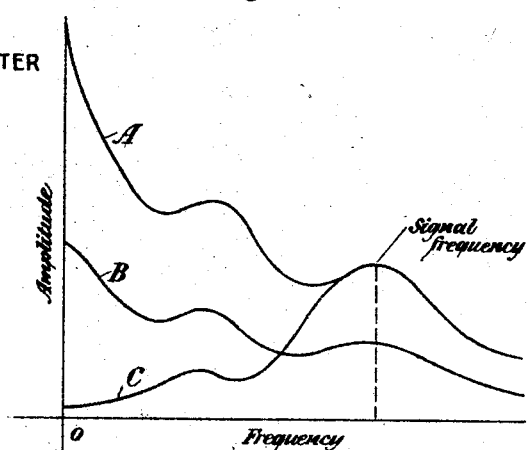

In the drawings Figure 1 is a diagram showing the relation of current and inductance in a certain loaded conductor, and Fig. 2 is a diagram of apparatus that may be employed in the practice of the invention. Fig. 3 is a diagram of current amplitudes under various conditions.

The example of the invention here to be described involves a long submarine telegraph cable continuously loaded with permalloy, a composition of nickel and iron in which extraordinarily high magnetic permeability is secured by a suitable heat treatment. Such a cable and some of the advantages accruing from it are described in United States Patent No. 1,586,874, issued June 1, 1926, to O. E. Buckley.

In the operation of a cable of this type by the simplex method, that is in one direction only at a time, the limiting speed of operation is determined in the following manner. The sending voltage is made as high as is compatible with considerations of safety, 50 volts being generally accepted as the safe limit for ordinary operation over long cables. With the sending voltage thus fixed the speed of signaling is established as the greatest speed which will permit the received signals to be legible through the external interference to which the cable is subject. The interference referred to may be of natural or artificial origin but is usually of natural origin, since the artificial disturbances arising from neighboring electric power lines can easily be eliminated by proper sea-earth connections. The natural disturbance, however, cannot be so easily disposed of and sets a lower limit to the permissible amplitude of signals, if they are to be legible. Since the strength of signals decreases rapidly as the speed of sending, or the frequency of impulses, is increased, the speed is thus limited by the interfering disturbances.

The considerations of the previous paragraph apply also to the ordinary or non-loaded cable when it is operated at the highest possible speed with simplex or one-way operation. However, with the non-loaded cable much greater efficiency can be secured by operating the cable in the two directions simultaneously, the outgoing signal being prevented from interfering seriously with the incoming signal by means of the well known duplex bridge arrangement in which the outgoing signal is transmitted simultaneously into the cable and an electrically equivalent artificial line, forming two arms of a Wheatstone bridge, the other two arms of which are closely equal capacities or resistances. The terminals of the receiver, being connected directly to the respective terminals of the cable and artificial line, are subjected to the same potential changes due to the transmitted impulse and consequently the receiving instrument does not respond to the outgoing signals. However, it does receive a considerable part of the energy of the incoming signals, which can thus be received independently of the signals being sent out. If the artificial line could be made the exact equivalent, electrically, of the cable, the same speed of operation in each direction could be secured by the duplex method as is secured in one direction only by the simplex method and the use of the duplex method would double the capacity of the cable for handling traffic. Owing to the fact that exact equality between the artificial line and the cable cannot be secured, it is usually impossible to realize all this gain, but, by great care in adjustment of the artificial line, the duplex speeds obtained in practice are made nearly as great as the simplex speed, the duplex speed being then limited by disturbances resulting from the slightly imperfect balance. This result is made possible because of the simple electrical characteristic of the non-loaded cable, which approximates very closely the simple combination of distributed resistance and distributed capacity. Such inductance and leakance as the cable has are so small as to be negligible in the ordinary case, or if taken into account can be balanced by relatively simple modifications of the artificial line.

In the case of the loaded cable efficient duplex operation is not so easily secured. This is because, in addition to the direct current resistance and capacity which are the only factors of importance in balancing a non-loaded cable, the inductance and alternating current resistance introduced by the magnetic loading material have also to be balanced and since these factors vary both with regard to frequency of impulses and with regard to amplitude, a relatively complicated artificial line is required to balance them. An artificial line suitable for such a purpose is described in United States Patent No. 1,551,797, issued September 1, 1925, to O. E. Buckley.

Any artificial line to balance a loaded cable effectively must have not only the same inductance, capacity, resistance and leakance per equivalent unit of length of line under one set of conditions, but since in the loaded cable some of these factors are variable, must also have the same variations of these factors with frequency and amplitude of current. It is apparent that the more accurately these factors and their variations in the cable can be matched in the artificial line, the higher will be the speed of duplex operation which can be secured up to the point where the speed is limited by external interference.

By the present invention there is attained a more accurate balance of these variable factors by the control of the transmitted current in a particularly favorable manner and by the control, through the transmitted current, of the magnetic condition of the loading material both that which is a part of the cable and that which is used in the artificial line to contribute to its inductance.

At any instant during the transmission of a telegraph message over a submarine cable, the current into the cable can be considered as made up of sinusoidal currents of frequencies which form a continuous band from zero to a value which is high compared to the signal frequency, and of amplitudes which have values relative to one another, somewhat as shown in curve A of Fig. 3. It can be shown that when one or more sinusoidal currents flow in a conductor which is continuously loaded with permalloy, electromotive forces are introduced of frequencies which are harmonics of the various fundamental frequencies, or which are the sum or difference of harmonics of any number of these fundamental frequencies. The amplitude of any one of these induced voltages is a function of the amplitudes of the currents of fundamental frequencies involved and is liable to be of considerable magnitude for values of current amplitude encountered in submarine cables. The effect of these induced voltages in a cable is to give rise to currents of the various frequencies, and it may happen that the harmonic or combination frequency of a current originating from a fundamental current of low frequency, coincides with a value of frequency which is very important component of the signal. For example, if the speed of signaling was such that the "reversal frequency" was 60 cycles, then the first harmonic of 30 cycles, the second harmonic of 20 cycles, the third harmonic of 15 cycles, etc., would all be of frequency 60 cycles, and these harmonics of the transmitted signal would give rise to unbalance currents interfering with the received signal. The amplitude of these unbalance currents will of course depend upon the nature of the artificial line, but they cannot be entirely eliminated even with an artificial line specially designed for the purpose, as indicated above. As can be seen from curve A, Fig. 3, the components of these frequencies are of rather large amplitude in the transmitted signal, and since these lower frequencies suffer comparatively small attenuation by the cable the resulting harmonic induced voltages would be of large amplitude and would be scattered over a considerable part of the length of the cable.

The manner in which the inductance of a cable of the continuously loaded type varies with the current in the cable is shown in Fig. 1, in which the abscissæ are values of current and the ordinates are the corresponding values of inductance. This change of inductance with current is, of course, due to the non-linear change of magnetic induction with magnetizing force in the loading material. If the artificial line were the exact electrical equivalent of the cable it would also show the same relation as shown in Fig. 1. However, it is found extremely difficult in practice to make the artificial line the exact equivalent in this regard except for the lower values of current. See Figure 1. On this account a much more accurate balance between cable and artificial line can be secured if the current is kept to as low an amplitude as is practicable.

The resistance of the loaded cable can be divided conveniently into two parts, the direct current resistance, which is substantially constant as in the case of the non-loaded cable, and the alternating current resistance, which is introduced by the loading material and which is not constant but varies both with frequency and amplitude. This alternating current resistance is again divisible into two main parts, one due to magnetic hysteresis and the other due to eddy or Foucault currents in the loading material. The hysteresis resistance factor is proportional to the frequency and increases very rapidly with the current amplitude, while the eddy current resistance is proportional to the square of the frequency and increases much less rapidly with current amplitude. Both these factors have to be balanced in the artificial line, and as in the case of the variable inductance, the practicable accuracy of balance decreases as the current amplitude is increased.

There are two ways in which the unbalance currents due to the induced voltages in the cable can be diminished. First, the sending voltage can be reduced, as suggested hereinbefore, thus reducing the amplitudes of the various components of the signal proportionally, as shown in curve B, for the case where the sending voltage is reduced by one-half. This involves, of course, a loss in amplitude of the received signal. For this reason what is now referred to as the second method possesses certain advantages. In this method the lower frequency components of the transmitted message are reduced in amplitude (see curve C) so that the induced voltages arising from them are very small. The higher frequency components of the signal are reduced a lesser amount or maintained at their original value. Due to the fact that these higher frequencies suffer greater attenuation on the cable than the lower frequencies, the various components of the message will arrive at the receiving end more nearly in the proper relative proportion.

As to the suggestion of reducing the sending voltage, this means that instead of choosing the transmitting voltage as high as is consistent with safety, as is the practice in the case of non-loaded cables both for simplex and duplex operation, the practice now disclosed is to make the transmitting voltage as low as is consistent with having the received current legible through both the disturbances due to external interference and those due to lack of perfect duplex balance. That is, the transmitting voltage is reduced until the disturbances due to the imperfect duplex balance and those due to external or natural causes are of the same order of magnitude. The speed of signaling is then increased until the received signaling currents fall in amplitude to a point where the signals are just readable through the interference. By reducing the voltage, operation is confined to a narrower range of the curve of Fig. 1, the portion of small abscissa values. Since, as has been explained, a more perfect balance can be secured by the use of a low value of transmitted current, this practice will result in a higher speed and greater traffic capacity than if the ordinary practice of using the highest possible transmitting voltage were followed.

In the case of duplex working, if a high speed is desired one way, say from east to west, and a low speed is satisfactory the other way, that is from west to east, then east may send full speed and full voltage, and west will send at reduced speed and voltage of such values that the bridge unbalance currents will not mask receiving at that end. Notwithstanding the large bridge unbalance at east due to the full speed and voltage for sending at that end, east will be able to receive because of the low speed from west to east. This assumes that the shaping network is properly adjusted for this low speed. With such adjustment, the low speed will give higher received current than higher speed, and such higher received current will be legible notwithstanding the rather large bridge unbalance at east.

In addition to reducing the sending voltage generally, it has already been suggested herein specially to reduce the voltage of the low frequency components of the signal wave. This is accomplished in connection with the following procedure. The transmitted signal is distorted by means of a suitable terminal network in combination with the transmitting apparatus in such manner that the effect of the cable is to neutralize the distortion introduced by the network, giving a legible received signal without further correction of signal shape. This will be better understood by considering the common practice on non-loaded cables. In the operation of non-loaded cables the practice generally used is to transmit into the cable a signal which is distorted by the cable into a form which, if recorded directly at the receiving end, would be illegible. This distortion results from the unequal attenuation of the various frequency components of the transmitted signal, the components of high frequency being attenuated much more than those of low frequency. In order to make the signal legible a correcting network is used in combination with the receiving apparatus. This network, which consists usually of a capacity in series with the receiving instrument and an inductance in shunt around it, serves to attenuate the low frequency component of the signals more than the high frequency components, so that the total attenuation suffered by all frequency components of importance in shaping the signal is the same. Although a certain amount of correction is sometimes introduced at the sending end of the cable by means of the well known "sending condenser", the greater part of the shaping, or distortion correction, is usually done at the receiving end. Although this practice is advantageous for non-loaded cables, it is disadvantageous in certain respects in the case of the loaded cable, since the current amplitude obtained at various points along the cable is much greater than would be attained if the correcting networks were used in connection with the transmitting apparatus rather than in connection with the receiving apparatus. In the case in which the correcting network is used in connection with the receiving apparatus and the signal suffers only a small amount of distortion, or none, before application to the cable, the effect of the cable on the signal is to lengthen out the signal impulses so that successive transmitted impulses are superposed one on the other, giving a resultant high current amplitude. If, however, the correcting network is used in connection with the transmitting apparatus and the signal is deliberately distorted before application to the cable, then the distorted impulses pass discreetly over the cable without superposition, and the maximum amplitude of the current at any point on the cable is distinctly less than if the correcting network had not been used at the sending end. Although the signal impulses are distorted by the transmitting network, the distortion introduced by the cable serves to correct the signals so that they emerge from the receiving end in a shape to permit reading or operation of automatic apparatus with no or relatively little further correction.

A suitable form of correcting network is a condenser in series with the transmitting instrument and an inductance in series with a resistance shunted around the condenser and transmitter. It will be evident that such a network attenuates the low frequency components of the signal more than the high frequency components, while the cable has the reverse effect, giving at the receiving end, if the elements of the network are properly chosen, a signal in which the various frequency components of importance in shaping the signal are attenuated alike, with the result that the signal is legible.

Since the effect of such a transmitting network is to reduce the current amplitude, and since the currents put into the cable and the artificial line are affected alike by this process, and further since any reduction of current amplitude favors equality of balance between the artificial line and the cable, it follows that a greater speed of operation is attainable with the loaded cable by the use of the shaping network at the sending end as here described.

A description will now be given of how the magnetic condition of the loading material both of the artificial line and of the cable is controlled in such a manner that the variable factor of hysteresis resistance is substantially eliminated, and consequently any unbalance resulting from inequality of the hysteresis resistance of the cable and that of the artificial line is also eliminated. The elimination of hysteresis resistance is accomplished in the following manner. An alternator, or generator of alternating currents of frequency higher than any concerned in shaping the signal, hereinafter referred to as the hysteresis-suppression alternator, is placed in series with the transmitting apparatus in such a manner that a steady alternating current of constant amplitude and constant frequency flows at all times from the transmitting diagonal of the bridge onto the cable and artificial line. This current, which should be of greater amplitude than the signal, subjects the loading material in the part of the artificial line and the cable nearest the bridge to alternate magnetization and demagnetization so that the energy of magnetizing and demagnetizing the magnetic loading material is furnished principally by the hysteresis-suppression alternator. It is well known that if a magnetic material is subjected simultaneously to two alternating fields, one of high frequency and high amplitude and the other of lower frequency and lower amplitude, the hysteresis losses of the magnetic material are supplied principally from the high frequency source, and the magnetic material behaves to the low frequency current as if it were a material substantially without magnetic hysteresis. Thus, by the superposition of the high frequency current on the loaded cable and its artificial line the factor of hysteresis is removed from playing any significant part in the behavior of the cable or the artificial line as regards its effect on the transmitted signals.

With this arrangement the receiving apparatus is, of course, subject to high frequency disturbances resulting from imperfect balance between the artificial line and the cable for the frequency generated by the hysteresis-suppression alternator. However, the effect of this high frequency disturbance is eliminated from the receiving apparatus in accordance with this invention by interposing a network or electrical filter between the receiving apparatus and the duplex bridge. This filter is designed to pass the frequencies concerned in shaping the signal, but to repress higher frequencies and in particular disturbances resulting from the lack of balance for the currents from the hysteresis-suppression alternator.

It will be apparent that since the use of the hysteresis-suppression alternator substantially removes hysteresis as a variable factor and thereby permits a more accurate balance to be maintained, and since unbalance currents from the hysteresis-suppression alternator are prevented from entering the receiving apparatus, a higher speed of operation is attainable than would otherwise be possible. A further incidental advantage of the use of the hysteresis-suppression alternator lies in the fact that transmission is improved, since the absorption of energy of the signal by hysteresis is prevented and a further gain in speed results from this account. In certain cases it may be advisable to employ a current of such high frequency from the hysteresis-suppression alternator that by attenuation it becomes negligible at the receiving end.

Referring to Fig. 2, the continuously loaded submarine cable 1, has like terminal apparatus at the ends, of which one set will be described. The cable 1 and its balancing artificial line 2 makes two ratio arms of the Wheatstone bridge, the other two arms being through the respective condensers 3, 3. In the transmitting bridge is the transmitter 5 with a signal distorting condenser 4 and an adjustable resistance 6 in series, all shunted by the series combination of adjustable inductance 8 and adjustable resistance 9. The elements 4, 6, 8 and 9 are comprised in the distortion compensating network. In series with the transmitter 5 and associated network is the A. C. generator 7 for hysteresis suppression. In the receiving bridge is the filter 11 and connected to its shunt terminals is the receiver 10. The apparatus at the opposite end of the line is distinguished by primes on the reference numerals.

In order to obtain a favorable condition for greater duplex balance and consequently for high speed of signaling by this disposition of apparatus, the following procedure is employed. The hysteresis suppression alternators 7 and 7' are adjusted to give a frequency higher than any that it is expected will be involved in the signal; for instance, if the fundamental frequency of the signal is in the neighborhood of 60 cycles the frequency of the alternators 7, 7' may be conveniently made 200 to 300 cycles. Since frequencies up to about double the fundamental frequency are concerned in shaping the signal, it is desirable to have the frequency of the hysteresis suppression alternator substantially higher than twice the fundamental frequency of the signal. The voltage of the hysteresis suppression alternator should be as high as is consistent with safety; that is, of the order of 50 volts. The shaping network consisting of the elements 4, 6, 8 and 9, is adjusted so that a properly shaped signal is received at the distant end of the cable. The transmitting apparatus 5 is so adjusted that at the highest possible speed of duplex operation the received current is as low as is permitted by conditions of external interference. The particular voltage of the transmitting apparatus necessary to meet this condition depends, of course, on the accuracy of balance between the artificial line and the cable. If the balance obtained is substantially as good as that obtained on non-loaded lines, the voltage of the transmitting apparatus should be about 10 to 20 volts. If not so good a balance is practically obtainable, a lower transmitting voltage is more advantageous.

Although the use of reduced current amplitude and sending end shaping and hysteresis suppression have been described above with particular reference to securing more efficient duplex operation, it is further to be noted that additional advantages may be secured by the use of these methods together or separately. Such an advantage is that of reducing or eliminating magnetic distortion which may be of consequence on certain loaded conductors of the general type referred to. By magnetic distortion is meant the change of received signal shape which results from the non-linear B—H characteristic and the hysteresis of the loading material. This type of distortion, which is not present on non-loaded cables, may be regarded as an interference of the signal with itself, or an interference of one part of the signal with another part of the same signal. In particular the harmonics of the lower frequency components may be added to the fundamentals of the higher frequency components giving an objectionable change of signal shape and consequently limiting the speed, even for simplex operation. It will be clear from the preceding discussion that, since, the improvements described result in the reduction of harmonics induced by the loading material they also result in the reduction or elimination of magnetic distortion.

I claim:

1. The method of duplex operation of a signaling conductor having variability of impedance as a function of current, which comprises applying a sending voltage so low that it brings unbalanced interference down to the same order of magnitude as external interference.

2. The method of duplex operation of a loaded signaling conductor, which comprises applying a sending voltage so low that the order of magnitude of the interference due to unbalance between the conductor and its balancing network becomes substantially as low as the extraneous interference.

3. The method of duplex operation of a signaling conductor loaded with permeable material, which comprises applying a sending voltage so low that the inductance and resistance of the conductor depart only a little from constancy, and thereby the unbalance interference is brought down to the same order of magnitude as external interference.

4. The method of operation of a signaling conductor having variability of impedance as a function of current, which comprises putting current of low density on the line and thereby developing only a narrow range of said variability.

5. The method of operation of a loaded signaling conductor, which comprises applying currents of low density to the line and thereby developing only slight departure from constancy of inductance and effective resistance in the line.

6. The method of operation of a signaling conductor having variability of impedance as a function of current, which comprises compensating distortion at the sending end and thereby working the conductor at low current density.

7. In combination, a continuously loaded submarine signaling conductor, sending apparatus for transmitting signals over said conductor, and means associated with said transmitting apparatus for counter-distorting the signals before subjecting them to the normal distortion of the loaded conductor.

8. In combination, a continuously loaded submarine signaling conductor, sending apparatus for transmitting signals over said conductor, and means associated with said transmitting apparatus for counter-distorting the signals and attenuating them so that they go over the line at reduced current density and thus suffer less distortion upon the line due to non-constancy with current variation of the inductance and effective resistance of the line.

9. The method of duplex operation of a signaling conductor, which comprises distorting the signals at the sending end so that they are transmitted by the line with reduced interference.

10. The method of duplex operation of a signaling conductor having variability of impedance as a function of current, which comprises applying voltage to the conductor of a nature to reduce that variability while signaling is in progress and thus improve the duplex bridge balance.

11. The method of operation of a signaling conductor loaded with permeable material, which comprises applying a relatively high frequency alternating voltage to the conductor to reduce the hysteresis effect and filtering the corresponding high frequency currents from the signaling currents at the receiving end.

12. The method of reducing the hysteresis effect in a loaded signaling conductor, which comprises applying at the sending end an alternating current of a frequency so high that by attenuation it becomes negligible at the receiving end.

13. In combination, a signaling conductor, a bridge at one end, receiving apparatus at that end, and a sending source of such voltage that the unbalance sending currents in the receiving apparatus are of the same order of magnitude as the external interference.

14. In combination, a continuously loaded submarine signaling conductor, a transmitter and a shaping network associated with the transmitter to distort the signals to compensate in part at least for the distortion of said loaded conductor, the signaling voltage impressed upon said signaling conductor being of the order of 20 volts or less.

15. In combination, a signaling conductor having impedance variable with current, a transmitter associated with one end thereof and a shaping network associated with the transmitter and adapted to counter-distort the signal impulses and reduce the current on the line so that when the signal impulses have suffered normal distortion on the line they will be received in proper shape.

16. In combination, a loaded signaling conductor, a transmitter connected to one end thereof and a distortion compensating network comprising a condenser in series with the transmitter and an inductance in shunt around both the transmitter and condenser.

17. In combination, a signaling conductor, a transmitter connected to one end thereof and a distortion compensating network comprising a condenser in series with the transmitter, an inductance in shunt around both the transmitter and condenser and resistances respectively in series with the condenser and the inductance.

18. In combination, a long loaded submarine cable, transmitting and receiving apparatus associated therewith and a relatively high frequency alternating current generator in series with said cable to reduce the hysteresis effect with respect to signaling currents.

19. In combination, a loaded submarine signaling conductor, a sending source of low voltage, and signal distortion compensating means at the sending end for compensating in part at least for distortion produced by the loading of the conductor.

20. In combination, a long submarine signaling conductor loaded with material having very high permeability, and means for effecting a reduced unbalance, comprising a source for impressing low voltage signals of the order of 20 volts or less upon said signaling conductor.

21. Terminal apparatus for a loaded submarine cable system for operating on the duplex bridge principle, which apparatus comprises means for applying signals to the cable having low voltage, and the low frequency components of which are specially low in intensity, and a balancing network for balancing the loaded submarine cable.

22. The method of duplex operation of a signaling conductor having variability of impedance as a function of current which comprises applying a sending voltage in which low frequency components are relatively of low amplitude.

23. The method of duplex operation of a signaling conductor having variability of impedance as a function of current which comprises applying a sending voltage of low intensity with the low frequency components made specially low in intensity.

24. The method of operating a loaded submarine cable system comprising a bridge and a balancing artificial line at each terminal, which method includes simultaneously sending signals of high voltage from one terminal and of low voltage from the other terminal.

25. The method of operating a loaded submarine cable system comprising a bridge and a balancing artifical line at each terminal, which method includes simultaneously sending signals of high voltage and at high speed from one terminal and other signals of low voltage and at low speed from the other terminal.

26. In combination, a long submarine signaling conductor loaded with material having very high permeability, and means for effecting a reduced unbalance and comprising a source for impressing signals on said conductor at a voltage substantially less than that employed on non-loaded submarine conductors whereby the loading material is more advantageously utilized than when higher voltages are employed.

27. In combination, a loaded conductor such that signals transmitted thereby are normally distorted due to the presence of the loading material, a transmitter for impressing signals on said conductor at a voltage substantially less than that ordinarily employed on non-loaded conductors of the same length, and a shaping network associated with said transmitter for counter-distorting signals transmitted by said conductor so as to compensate in part at least for the normal distortion of the signals in being transmitted.

In witness whereof, I hereunto subscribe my name this 16th day of August, A. D. 1922.

OLIVER E. BUCKLEY.